US009868135B2

(12) United States Patent
Williams et al.

(10) Patent No.: US 9,868,135 B2
(45) Date of Patent: Jan. 16, 2018

(54) AERODYNAMIC MICROSTRUCTURES HAVING SUB-MICROSTRUCTURES

(71) Applicant: The Boeing Company, Chicago, IL (US)

(72) Inventors: Timothy Leroy Williams, Burien, WA (US); Diane C. Rawlings, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/705,569

(22) Filed: May 6, 2015

(65) Prior Publication Data

US 2016/0325818 A1  Nov. 10, 2016

(51) Int. Cl.
| | |
|---|---|
| *B64C 1/38* | (2006.01) |
| *B05D 5/02* | (2006.01) |
| *B29C 59/02* | (2006.01) |
| *B29C 47/02* | (2006.01) |
| *B05D 1/30* | (2006.01) |
| *B64C 21/10* | (2006.01) |
| *B63B 1/36* | (2006.01) |
| *B29L 9/00* | (2006.01) |
| *B29L 31/30* | (2006.01) |

(52) U.S. Cl.
CPC ................ *B05D 5/02* (2013.01); *B05D 1/30* (2013.01); *B29C 47/025* (2013.01); *B29C 59/022* (2013.01); *B63B 1/36* (2013.01); *B64C 21/10* (2013.01); *B29C 2059/023* (2013.01); *B29L 2009/005* (2013.01); *B29L 2031/3076* (2013.01); *B64C 2230/26* (2013.01); *Y02T 50/166* (2013.01); *Y02T 70/121* (2013.01)

(58) Field of Classification Search
CPC .... B64C 1/38; B64C 3/26; B64C 1/12; B29C 59/022; B26C 2059/023
USPC .............................. 244/1 R, 130, 129.1, 200
See application file for complete search history.

(56) References Cited

U.S. PATENT DOCUMENTS

| | | | |
|---|---|---|---|
| 4,650,138 A * | 3/1987 | Grose | ..................... B64C 21/10 138/38 |
| 4,706,910 A | 11/1987 | Walsh et al. | |
| 4,736,912 A | 4/1988 | Loebert | |
| 4,865,271 A | 9/1989 | Savill | |
| 4,930,729 A | 6/1990 | Savill | |
| 4,932,612 A | 6/1990 | Blackwelder et al. | |

(Continued)

FOREIGN PATENT DOCUMENTS

| | | |
|---|---|---|
| EP | 2070688 | 6/2009 |
| WO | 03000483 | 1/2003 |

OTHER PUBLICATIONS

United States Patent and Trademark Office, "Non-Final Office Action," issued in connection with U.S. Appl. No. 14/705,564, dated Aug. 10, 2016, 32 pages.

(Continued)

*Primary Examiner* — Richard G Davis
(74) *Attorney, Agent, or Firm* — Hanley, Flight & Zimmerman, LLC

(57) ABSTRACT

Aerodynamic microstructures having sub-microstructure are disclosed herein. One disclosed example apparatus includes an aerodynamic microstructure on an external surface of a vehicle, and sub-microstructures superimposed on the aerodynamic microstructure, where the sub-microstructures are spaced to reduce reflections.

28 Claims, 11 Drawing Sheets

(56) References Cited

U.S. PATENT DOCUMENTS

| | | |
|---|---|---|
| 5,054,412 A | 10/1991 | Reed et al. |
| 5,069,403 A | 12/1991 | Marentic et al. |
| 5,133,516 A | 7/1992 | Marentic et al. |
| 5,133,519 A | 7/1992 | Falco |
| 5,445,095 A | 8/1995 | Reed et al. |
| 5,505,543 A | 4/1996 | Webbeking et al. |
| 5,520,717 A | 5/1996 | Miller et al. |
| 5,637,873 A | 6/1997 | Davis et al. |
| 5,766,306 A | 6/1998 | Olli et al. |
| 5,766,764 A | 6/1998 | Olli et al. |
| 5,860,626 A | 1/1999 | Moser |
| 5,874,167 A | 2/1999 | Rawlings et al. |
| 5,971,326 A | 10/1999 | Bechert |
| 6,177,189 B1 | 1/2001 | Rawlings et al. |
| 6,191,248 B1 | 2/2001 | Rawlings et al. |
| 6,345,791 B1 | 2/2002 | McClure |
| 6,376,063 B1 | 4/2002 | Rasmussen et al. |
| 6,475,616 B1 | 11/2002 | Dietz et al. |
| 6,699,579 B2 | 3/2004 | Rasmussen et al. |
| 6,958,207 B1 | 10/2005 | Khusnatdinov et al. |
| 6,982,794 B1 | 1/2006 | Davis et al. |
| 6,994,045 B2 * | 2/2006 | Paszkowski ............ B63B 1/38 114/67 R |
| 7,041,363 B2 | 5/2006 | Krohmer et al. |
| 7,044,073 B2 | 5/2006 | Goldstein |
| 7,052,586 B2 | 5/2006 | Rasmussen et al. |
| 7,070,850 B2 | 7/2006 | Dietz et al. |
| 7,221,513 B2 | 5/2007 | Cho et al. |
| 7,224,529 B2 | 5/2007 | King et al. |
| 7,298,554 B2 | 11/2007 | Cho et al. |
| 7,417,798 B2 | 8/2008 | King et al. |
| 7,444,932 B2 | 11/2008 | Strand et al. |
| 7,445,409 B2 | 11/2008 | Trice et al. |
| 7,525,785 B2 | 4/2009 | Rawlings |
| 7,544,407 B1 | 6/2009 | Rawlings et al. |
| 7,678,997 B2 | 3/2010 | Rawlings |
| 7,703,179 B2 | 4/2010 | Ferguson et al. |
| 7,755,670 B2 | 7/2010 | Utagawa |
| 7,757,591 B2 | 7/2010 | Trice et al. |
| 7,807,229 B2 | 10/2010 | Rawlings et al. |
| 7,864,501 B2 | 1/2011 | Rawlings et al. |
| 7,867,621 B2 | 1/2011 | Rawlings et al. |
| 7,931,841 B2 | 4/2011 | Huizinga et al. |
| 7,940,462 B2 | 5/2011 | Noguchi et al. |
| 8,038,102 B2 | 10/2011 | Miller et al. |
| 8,113,469 B2 | 2/2012 | Lang |
| 8,220,754 B2 | 7/2012 | McClure et al. |
| 8,286,909 B2 | 10/2012 | Lee |
| 8,292,226 B2 | 10/2012 | Sankrithi et al. |
| 8,343,298 B2 | 1/2013 | Rawlings et al. |
| 8,413,928 B2 | 4/2013 | Rawlings et al. |
| 8,444,092 B2 * | 5/2013 | Li ........................ B21B 1/227 244/130 |
| 8,460,779 B2 * | 6/2013 | Gupta ................... B64C 21/10 428/156 |
| 8,578,747 B2 | 11/2013 | Li et al. |
| 8,668,166 B2 | 3/2014 | Rawlings et al. |
| 8,678,316 B2 | 3/2014 | Rawlings et al. |
| 8,684,310 B2 | 4/2014 | Rawlings et al. |
| 8,687,342 B2 | 4/2014 | Rawlings et al. |
| 8,715,824 B2 | 5/2014 | Rawlings et al. |
| 8,733,702 B1 | 5/2014 | Rawlings et al. |
| 8,794,574 B2 | 8/2014 | Lang |
| 8,870,124 B2 | 10/2014 | Ireland |
| 8,876,052 B2 | 11/2014 | Rawlings et al. |
| 9,017,797 B2 | 4/2015 | Goelling |
| 9,272,791 B2 | 3/2016 | Brennan et al. |
| 9,297,394 B2 | 3/2016 | Li et al. |
| 9,352,533 B2 | 5/2016 | Rawlings et al. |
| 9,371,141 B2 | 6/2016 | Rawlings et al. |
| 2003/0133121 A1 | 7/2003 | Davis et al. |
| 2004/0126541 A1 | 7/2004 | Dietz et al. |
| 2004/0200932 A1 | 10/2004 | Scott et al. |
| 2005/0094277 A1 * | 5/2005 | Khusnatdinov ............ F41H 3/00 359/601 |
| 2005/0181203 A1 | 8/2005 | Rawlings et al. |
| 2006/0051592 A1 | 3/2006 | Rawlings et al. |
| 2006/0060722 A1 | 3/2006 | Choi et al. |
| 2007/0060026 A1 | 3/2007 | Sung |
| 2007/0194178 A1 | 8/2007 | Lang |
| 2007/0257400 A1 | 11/2007 | Stenzel et al. |
| 2008/0061192 A1 | 3/2008 | Sullivan |
| 2008/0233356 A1 | 9/2008 | Loher et al. |
| 2010/0080958 A1 | 4/2010 | Goelling |
| 2010/0108813 A1 | 5/2010 | Lang |
| 2010/0127125 A1 | 5/2010 | Li et al. |
| 2010/0187360 A1 | 7/2010 | Rawlings et al. |
| 2010/0187361 A1 | 7/2010 | Rawlings et al. |
| 2010/0282909 A1 | 11/2010 | Rawlings et al. |
| 2010/0308177 A1 | 12/2010 | McClure et al. |
| 2011/0006165 A1 | 1/2011 | Ireland |
| 2011/0008174 A1 | 1/2011 | Ireland |
| 2011/0073710 A1 * | 3/2011 | Rawlings ................ B64C 21/10 244/130 |
| 2011/0186685 A1 | 8/2011 | Tsotsis et al. |
| 2011/0262705 A1 | 10/2011 | Gupta et al. |
| 2011/0274875 A1 | 11/2011 | Lang |
| 2012/0025025 A1 | 2/2012 | Brennan et al. |
| 2012/0227453 A1 | 9/2012 | Li et al. |
| 2013/0028744 A1 | 1/2013 | Nordin et al. |
| 2013/0062004 A1 | 3/2013 | Amirehteshami et al. |
| 2013/0107278 A1 | 5/2013 | Meyer et al. |
| 2013/0193270 A1 | 8/2013 | Rawlings et al. |
| 2013/0257055 A1 | 10/2013 | Simpson |
| 2014/0023837 A1 | 1/2014 | Miller et al. |
| 2014/0099475 A1 | 4/2014 | Rawlings et al. |
| 2014/0110263 A1 | 4/2014 | Barbier et al. |
| 2014/0116597 A1 | 5/2014 | Miller et al. |
| 2014/0130318 A1 | 5/2014 | Rohr et al. |
| 2014/0174642 A1 | 6/2014 | Rawlings et al. |
| 2014/0238646 A1 | 8/2014 | Enright |
| 2014/0242285 A1 | 8/2014 | Pettersson et al. |
| 2014/0248453 A1 | 9/2014 | Li et al. |
| 2014/0248469 A1 | 9/2014 | Rawlings et al. |
| 2014/0255632 A1 | 9/2014 | Gradert et al. |
| 2014/0272237 A1 | 9/2014 | Roper et al. |
| 2014/0295143 A1 | 10/2014 | Rawlings et al. |
| 2014/0332631 A1 | 11/2014 | Rawlings et al. |
| 2014/0356219 A1 | 12/2014 | Gammel et al. |
| 2014/0363637 A1 | 12/2014 | Kovach et al. |
| 2015/0017385 A1 | 1/2015 | Lang |
| 2015/0053289 A1 | 2/2015 | Kurtovic et al. |
| 2015/0136909 A1 | 5/2015 | Kruckenberg et al. |
| 2016/0107371 A1 * | 4/2016 | Hurme ................. B29C 43/222 264/210.2 |
| 2016/0159466 A1 | 6/2016 | Daggett et al. |
| 2016/0168685 A1 | 6/2016 | Surply et al. |
| 2016/0243586 A1 | 8/2016 | Travis |
| 2016/0271930 A1 | 9/2016 | Roper et al. |
| 2016/0325823 A1 | 11/2016 | Rawlings et al. |
| 2016/0325824 A1 | 11/2016 | Rawlings |

OTHER PUBLICATIONS

European Patent Office, "Extended Search Report," issued in connection with European Patent Application No. 16162961.3, dated Sep. 13, 2016, 9 pages.

United States Patent and Trademark Office, "Non-Final Office Action," issued in connection with U.S. Appl. No. 14/705,547, dated Nov. 3, 2016, 40 pages.

European Patent Office, "Extended European Search Report," issued in connection with European Patent Application No. 16167099.7, dated Nov. 11, 2016, 8 pages.

European Patent Office, "Extended European Search Report," issued in connection with European Patent Application No. 16167118.5, dated Nov. 11, 2016, 8 pages.

United States Patent and Trademark Office, "Notice of Allowance," issued in connection with U.S. Appl. No. 14/705,564, dated Mar. 1, 2017 (5 pages).

(56) References Cited

OTHER PUBLICATIONS

United States Patent and Trademark Office, "Notice of Allowance," issued in connection with U.S. Appl. No. 14/705,547, dated May 8, 2017 (8 pages).

\* cited by examiner

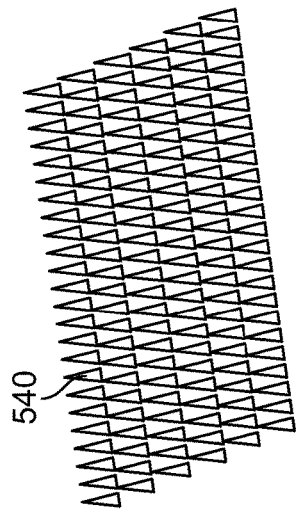
FIG. 5A
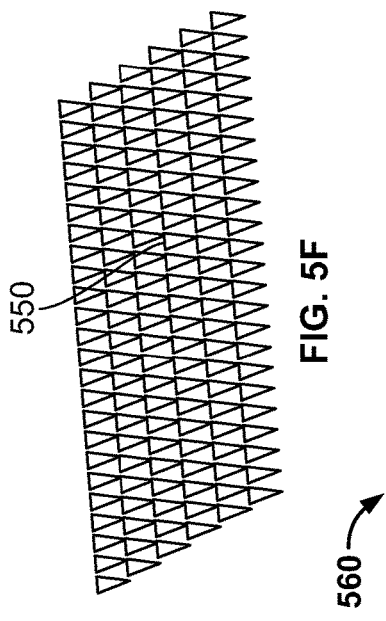
FIG. 5B
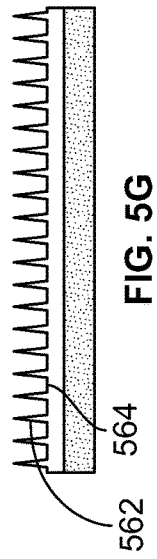
FIG. 5C
FIG. 5D
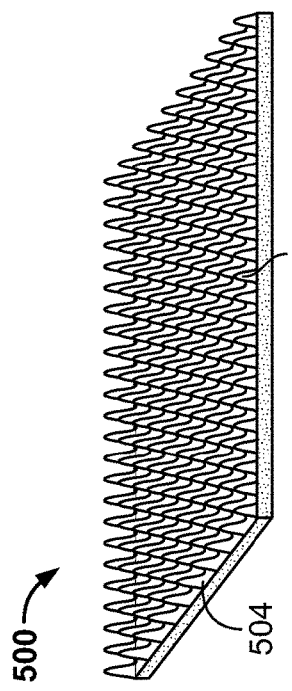
FIG. 5E
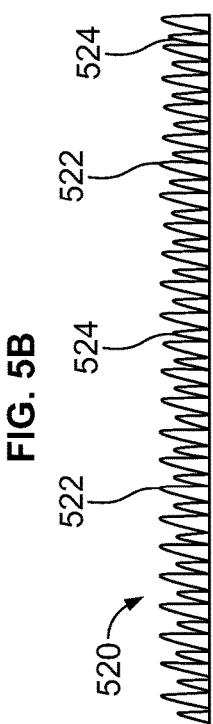
FIG. 5F
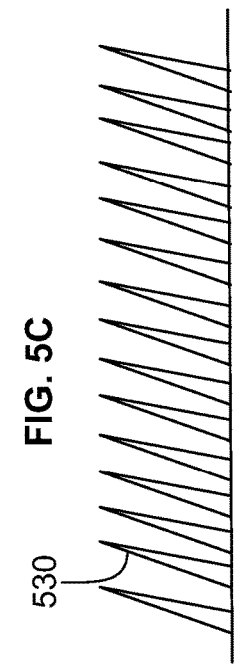
FIG. 5G

AERODYNAMIC MICROSTRUCTURES HAVING SUB-MICROSTRUCTURES

FIELD OF THE DISCLOSURE

This patent relates generally to microstructures and, more particularly, to aerodynamic microstructures having sub-microstructures.

BACKGROUND

Microstructures are typically used on an aircraft to alter flight characteristics and/or dynamics of the aircraft. In particular, microstructures such as riblets are used on surfaces of an aircraft wing, a fin or a fuselage of an aircraft to reduce drag and/or a drag coefficient of the aircraft, which can result in overall fuel savings and/or reduction in carbon-dioxide emissions, etc. However, riblets and other microstructures can also cause or prevent certain optical effects and characteristics including high reflectivity, directional reflectiveness, and/or other potential effects to the aesthetics of the aircraft based on their geometry. High reflectivity and the associated directional reflectiveness is often referred to as glint, which can affect the visibility and/or an aesthetic look of an aircraft. Riblets may cause glint in atypical directions due to their geometries, shapes and/or features in comparison to typical aircraft surfaces (e.g., wing surfaces, fuselage surfaces, etc.).

In some situations, high glint is preferred and in other situations, high glint is not preferable. Some known solutions to reduce glint include low reflectivity optical coatings such as a flat black paint or multilayer film coatings. However, these solutions are not generally effective at high glancing angles (e.g., approaching 90 degrees from a surface normal) where glint is almost always produced. Other known solutions include decals, but applying these to aerodynamic surfaces such as riblets can have negative impacts on the aerodynamic properties of the riblets and, thus, reduce the riblet effectiveness.

SUMMARY

An example apparatus includes an aerodynamic microstructure on an external surface of a vehicle, and sub-microstructures superimposed on the aerodynamic microstructure, where the sub-microstructures are spaced to reduce reflections.

An example method includes using a vehicle, where sub-microstructures are superimposed on aerodynamic microstructures of the vehicle, and where the sub-microstructures are separated by distances approximately a wavelength of visible light to reduce reflections.

Another example method includes providing sub-microstructures on an aerodynamic microstructure, where the sub-microstructures are spaced to reduce reflections.

Yet another example method includes providing a textured external surface, via a tool, onto a riblet associated with an external surface of a vehicle to reduce glint.

Another example apparatus includes an aerodynamic microstructure on an external surface of a vehicle, where the aerodynamic microstructure has primary peaks and base surfaces between the primary peaks, and secondary peaks on or proximate the base surfaces, where the secondary peaks have heights less than one-third of heights of the primary peaks.

BRIEF DESCRIPTION OF THE DRAWINGS

FIGS. 5A-5G illustrate example shapes that may be used to implement microstructures as well as sub-microstructures that may be superimposed on microstructures.

Figure 1:
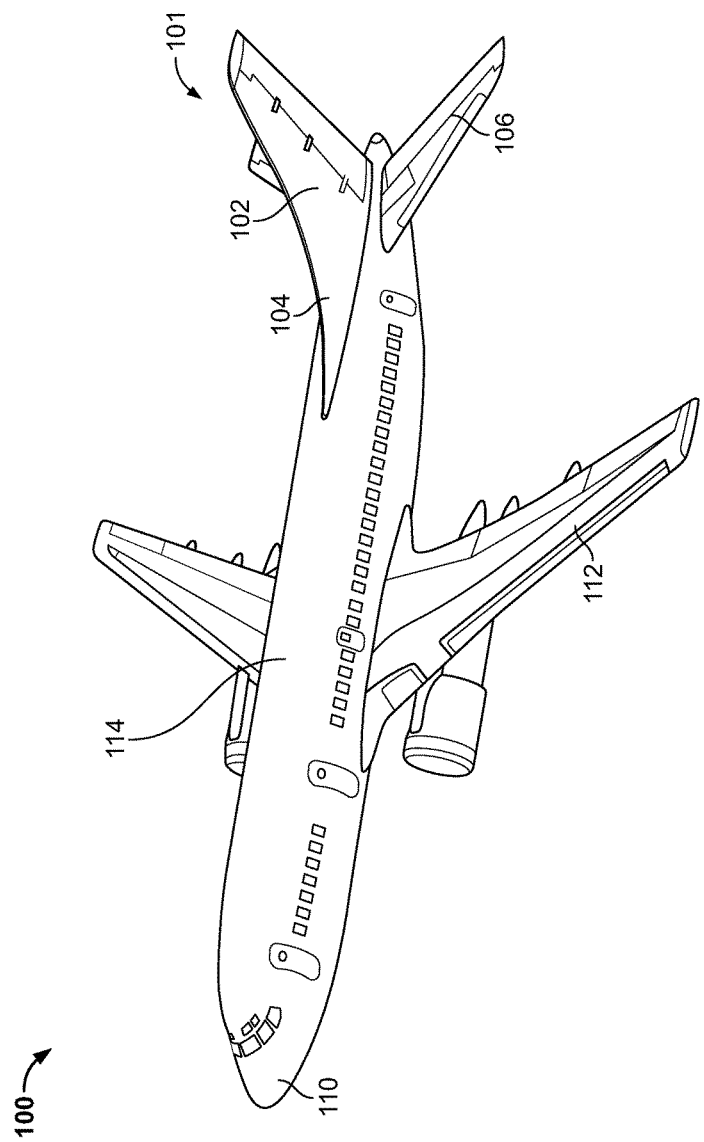
FIG. 1 illustrates an example aircraft that may be used to implement the example methods and apparatus disclosed herein.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Aerodynamic structures having sub-microstructures are disclosed herein. Microstructures such as riblets, for example, are typically used on aerodynamic surfaces of an aircraft to alter and/or improve flight characteristics to reduce an overall drag of the aircraft, for example, and, thus, may result in in overall fuel savings and/or reduction in carbon-dioxide emissions, etc. However, these riblets and other aerodynamic microstructures can also cause certain associated and/or unintended optical/visual effects including changing the reflectivity at certain angles and/or viewing angles, thereby potentially causing glints and/or other potential effects to the aesthetics of the aircraft (e.g., gloss, color effects, color distortions, etc.).

Aircraft and/or external microstructures associated with the aircraft such as riblets may have finished, smooth and/or polished surfaces, which have high reflectivity and may result in Fresnel reflections that can cause glints. The resulting glint in directions generally aligned with the riblets can reflect a large amount of light towards pilots flying other aircraft and/or observers of the aircraft. The glint can also affect the visibility and/or viewing capabilities of a pilot of the aircraft (e.g., the pilot is visually impaired by sunlight reflected from a nose of the aircraft in which the pilot is flying). In certain examples, it may be advantageous to have low gloss and/or reduced reflectiveness (e.g., military applications, etc.).

The examples disclosed herein utilize sub-microstructures (e.g., nanostructures), which may or may not be nano-scale (e.g., approximately on a scale of $10^{-9}$ meters in dimension(s)), superimposed on or under microstructures (e.g., external aerodynamic microstructures) to reduce glint and/or reflections (e.g. Fresnel reflections, etc.) that may be caused by the microstructures, for example. In some examples, the microstructures in which the examples are implemented on are applied to a vehicle (e.g., an aircraft, a land based vehicle, a submarine, etc.). These riblets are used for drag coefficient reduction of the vehicle. In some examples, the sub-microstructures are used to customize the optics and/or aesthetics of surfaces or features of the vehicle on which the example microstructures are provided.

The examples disclosed herein allow vehicle surfaces to reduce reflections and/or glint from the vehicles for applications in which it may be advantageous to have lower reflectiveness. The examples disclosed herein also allow for customized optical effects of the vehicles. In particular, some examples allow certain aesthetic features such as a color layer to be viewed from certain pre-defined angles by limiting or increasing reflectivity or transmissivity at certain positions and/or viewing angles relative to a viewable external surface of a vehicle, for example. The color layer may be mechanically coupled to microstructures and/or integral with the microstructures for different decorative and/or reflective effects. In some examples, the color layer and/or the microstructures may have interface features (e.g. a textured surface) between the color layer and the microstructures for different optical effects such as light absorption or refractive effects.

In some examples, sub-microstructures are provided to a microstructure by machining or any other appropriate processing. In particular, the sub-microstructures may be formed on a microstructure via roll-forming or embossing processes, for example. In some of the examples disclosed herein, the sub-microstructures are formed on the microstructure as the microstructure is extruded (e.g., an inline secondary process). Providing and/or creating sub-microstructures may occur via direct surface modification or indirectly via creation of a tool for roll-forming or embossing, or by extrusion molding, casting, spraying, etching, etc.

As used herein, the term "microstructure" may refer to geometric features, dimensions and/or distances between geometric features (e.g., periodic distances, heights and/or widths, etc.) having sizes of approximately 10-200 microns, but typically 75-125 microns. As used herein, the term "sub-microstructure" may refer to geometric features, dimensions and/or distances in which geometric features (e.g., periodic or non-periodic distances, heights and/or widths, etc.) are significantly smaller than a microstructure. In these examples, sub-microstructures may have sizes of approximately 0.1-10 microns. Some sub-microstructures, which are sometimes referred to as "nanostructures," may range in size and/or distance (e.g., a periodic distance) at approximately equal to, or less than, a wavelength of visible light, which is about 0.4-0.7 microns. Thus, the term "sub-microstructure" may also refer to dimensions less than about 0.4 microns. Therefore, for the terms "microstructure" and "sub-microstructure" as used herein, the phrase "approximately equal to a wavelength of light" means a dimension that can range from about 0.1-10 microns.

FIG. 1 illustrates an example aircraft 100 in which the examples disclosed herein may be implemented. The aircraft 100 of the illustrated example includes a tail section 101 including a vertical fin 102 adjacent to a dorsal fairing 104, horizontal stabilizers 106, a nose section (e.g., a cockpit section) 110 and wings 112 attached to a fuselage 114. The examples described herein may be applied to surfaces and/or features (e.g., riblets) of any of the tail section 101, the nose section 110, the stabilizers 106, the wings 112 and/or the fuselage 114, or any other exterior or outboard structure (e.g., a wing strut, an engine strut, a canard stabilizer, etc.) and/or surface.

Figure 2:
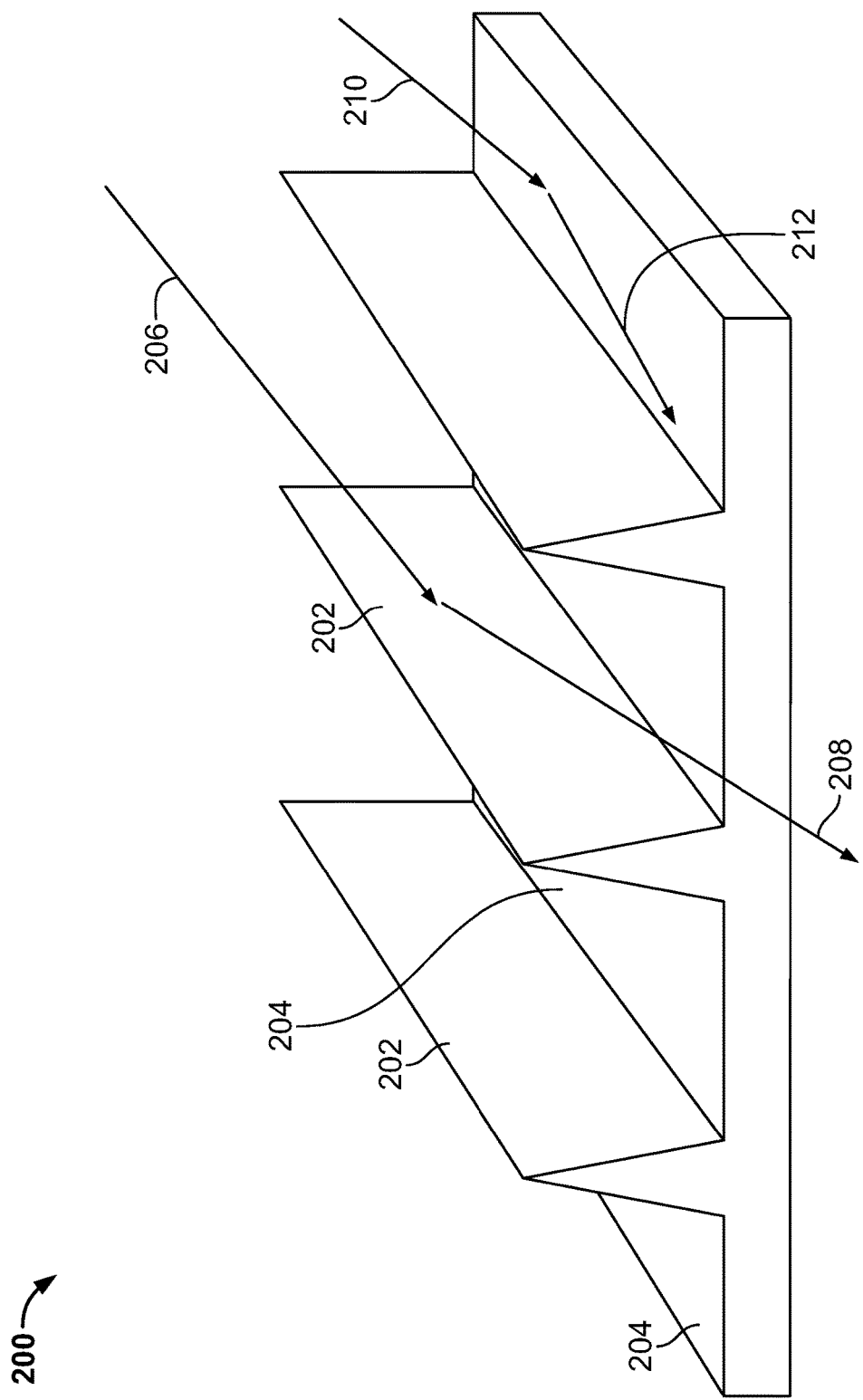
FIG. 2 is an example riblet microstructure from an external surface of the example aircraft of FIG. 1 on which the examples disclosed herein may be implemented.

FIG. 2 is an example microstructure 200 from an external surface of the example aircraft 100 of FIG. 1 on which the examples disclosed herein may be implemented. The microstructure 200 of the illustrated example includes ridges 202, which are spaced apart from one another, and base surfaces (e.g., valleys, aircraft surfaces, etc.) 204 that space the ridges 202 apart from one another. In this example, the profiles of the ridges 202 are generally triangular, thereby defining ridges having generally triangular cross-sections. A profile of the microstructure 200 is extruded to define the microstructure 200 (e.g., a defined volume of the microstructure 200). While the example microstructure 200 is extruded in this example, the example microstructure 200 may be formed by embossing, casting, pressing, thermo-forming, machining, etc. In other examples, the base surfaces 204 may have ridges that are smaller than the ridges 202 (e.g., less than a third of the height of the ridges 202) to control glint.

In this example, the microstructure 200 is a riblet of the aircraft 100 and is used to alter the aerodynamic characteristics of the aircraft 100 by reducing an overall drag of the aircraft 100, for example, and may be located on any external surface of the aircraft 100. The microstructure 200 of the illustrated example is used to reduce aerodynamic drag by controlling the turbulent boundary layers and/or preventing cross-flows associated with a turbulent boundary layer in air near an external surface of the aircraft 100. In particular, the example microstructure 200 has the ridges 202 and is installed on the external surface of the aircraft 100 and aligned with a desired direction of airflow. This alignment allows the ridges 202 to act as small fences or ridges that disrupt and reduce lateral airflow motions near the external surface to enhance in-line turbulent airflow and reduce skin friction from the external surface, thereby reducing overall drag of the aircraft 100. In some examples, the microstructure 200 is not attached or installed on the external surface during or after manufacturing of the aircraft 100 but, rather, is integral with the external surface. For example, the microstructure 200 may be pre-formed into or on the external surface (e.g., machined or molded onto a skin surface, built into a composite cured part, robotically placed, etc.) instead of being coupled (e.g., mechanically adhered) to the external surface.

The overall geometry of the microstructure 200 may cause directional (e.g., forward-scattering or back-scattering) reflections, generally, and/or an optical phenomenon known as glint. Glint occurs most commonly when light strikes a surface at certain angles near the surface (e.g., incident angles far from the surface normal) causing light rays to reflect onward (e.g., forward scattering) from surfaces and/or facets of the microstructure 200 toward certain viewing angles and/or positions relative to the microstructure 200 and the aircraft 100. Incident light may strike the surface from direct illumination, or from a reflection from another surface. In some examples, this reflectance may cause glint at certain viewing angles and/or positions relative to the microstructure 200. As seen in the view of FIG. 2, an incident light ray 206 may strike one of the ridges 202 nearly parallel to the ridge surface and, thus, a reflection 208 travels onward towards the base surfaces 204, where the reflected light ray 208 may be absorbed, transmitted, or reflected. Similarly, a ray 210, for example, may result in a reflection 212 from the base surfaces 204 towards a surface of one of the ridges 202. The reflections 208, 212 are sometimes referred to as grazing angle light reflections because they are reflections resulting from incident rays that graze (strike the surface at angles far from normal) the surface and can cause undesirable and/or unintended optical effects including intense reflections and/or glint.

Figure 3:
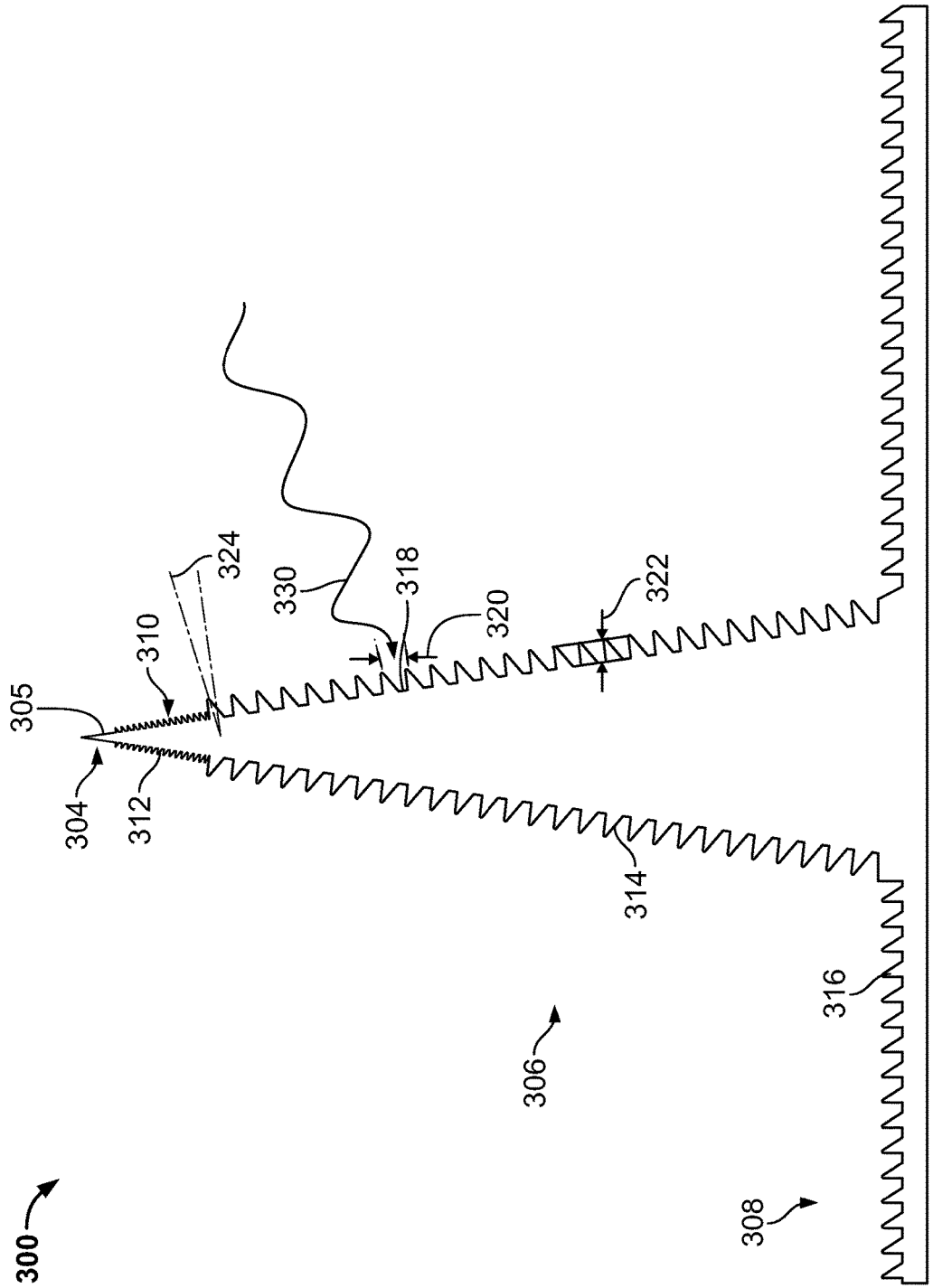
FIG. 3 is a cross-sectional view of an example microstructure with a superimposed sub-microstructure in accordance with the teachings of this disclosure.

FIG. 3 is a cross-sectional view of a microstructure (e.g., a riblet, an extruded riblet) 300 having superimposed sub-microstructures (e.g., nanoridges, sub-microstructure patterns, etc.) in accordance with the teachings of this disclosure. The microstructure 300 of the illustrated example has different portions, which include a distal portion 304 with a tip 305, an intermediate portion 306 and a base portion 308. In this example, the distal portion 304 is separated from the intermediate portion 306 by a transition portion 310, in which the sub-microstructures may transition (e.g., gradually transition) from one size to another. The transition portion 310 has sub-microstructures 312 and the intermediate portion 306 has sub-microstructures 314. Likewise, the base portion 308 of the illustrated example has sub-microstructures 316. In some examples, the tip 305 may be too small to have sub-microstructures superimposed onto the tip 305. However, in some examples, nano-scale sub-microstructures may be superimposed proximate and/or on the tip 305.

Each of the sub-microstructures 312, 314, 316 of the illustrated example has characteristic features. For example, the sub-microstructure 314 has characteristic features including base surfaces (e.g., valleys) 318, a spacing (e.g., periodic, non-periodic) 320, peak heights 322 and slope angles (e.g., an angle relative to a surface or facet of the microstructure 300) 324. In this example, a light ray 330 is shown being directed towards the intermediate portion 306. In this example, a wavelength of the light ray 330 is similar to the distance 320 and as the light ray 330 travels towards the sub-microstructures 314, a portion of the light ray 330 is transmitted to one of the base surfaces 318 and another portion of the light ray 330 is reflected from the sub-microstructures 314. As a result of the wavelength of the light ray 330 being approximately similar in size to the spacing 320, a significant portion of the light ray 330 is absorbed by the sub-microstructures 314 and, thus, the portion of the light ray 330 reflected from the sub-microstructures 314 is significantly reduced and/or eliminated, thereby reducing reflections and/or glint produced by the light ray 330. Additionally, because the sub-microstructures 314 have ridges with relatively smoothly increasing ridge width towards the base surfaces 318 (e.g., the sub-microstructures 314 are wider at their base in comparison to their respective tips) and distances on the order of a wavelength of visible light, they create a gradient index of refraction on a surface of the microstructure 300. Alternatively, the overall width varying shape of the microstructures 314 towards the base surfaces 318 facilitates light components reflecting from the microstructure 314 (e.g., Fresnel reflections).

The example sub-microstructures 312 of the distal portion 304 of the transition portion 310 have relatively smaller peak heights and spacing distances (e.g., periodic distances) in comparison to the sub-microstructures 314 and/or the sub-microstructures 316. Thus, in a manner fashion to the sub-microstructures 314 described above, the sub-microstructures 312 of the illustrated example reduce and/or minimize reflections or glint resulting from incident light rays. In this example, the sub-microstructures 312 are relatively smaller and more densely packed together in comparison to the sub-microstructures 314 to retain a certain aerodynamic smoothness of the microstructure 300. In particular, larger sub-microstructures in the transition region 310 and/or near the tip 305 may cause increased drag and/or turbulence. In this example, the sub-microstructures 312 do not extend into the tip 305 to prevent durability issues, damage and/or premature structural failure of the microstructure 300. Further, in some examples, sub-microstructures located near a distal end of a microstructure or a transition region near the distal end are relatively smaller (e.g., height and/or periodic distance(s), etc.) for greater ease of manufacturability and/or based on manufacturing constraints.

In this example, the sub-microstructures 316 have peak heights and distances similar to the sub-microstructures 314. Alternatively, the peak heights and/or the distances of the sub-microstructures 316 may vary in comparison to the sub-microstructures 314 and/or the sub-microstructures 312. In some examples, the sub-microstructures 316 may differ from the sub-microstructures 314 in some locations, but have a transition gradient where the sub-microstructures 316 adjacent the sub-microstructures 314 have dimensional characteristics similar to those of the sub-microstructures 314, but vary further from the sub-microstructures 314. Likewise, the sub-microstructures 314 may have a transition gradient to the sub-microstructures 312 and vice-versa.

While the sub-microstructures 312, 314, 316 are shown protruding generally perpendicular to surfaces of the microstructure 300 in some locations, any of the sub-microstructures 312, 314, 316 may be angled and/or shaped relative to the respective surfaces of the microstructure 300 (e.g., they may be slanted) from which they extend. In some examples, such angling of the sub-microstructures 312, 314, 316 increases ease of manufacturability (e.g., tool removal in machining, casting or molding processes, etc.) of the sub-microstructures 312, 314, 316. Further, angling the sub-microstructures 312, 314, 316 relative to the surfaces of the microstructure 300 may allow for different visual effects and/or reflection angles for light rays incident on the microstructure 300. In some examples, such angling and/or shaping may also allow reflections to be viewed at only certain angles (e.g., viewing angles) relative to the microstructure 300.

While the example sub-microstructures 312, 314, 316 are also shown in FIG. 3 as having substantially regular patterns (e.g., distances between individual sub-microstructures are relatively similar) and/or relatively uniform heights among individual sub-microstructures, characteristics of the sub-microstructures 312, 314, 316 may vary over portions of the microstructure 300. For example, the distance (e.g., the periodic distance) 320 of the sub-microstructures 314 may vary from the base portion 308 to the tip 305 (e.g., lengthening or shortening of the distance 320 and/or lengthening or shortening of the peak heights 322). In some examples, the overall shape, geometry and/or structure(s) of sub-microstructures may vary over different portions of the microstructure 300 (e.g., ridge-shaped sub-microstructures in one portion and cone-shaped sub-microstructures in another portion of a microstructure). Additionally or alternatively, any of the sub-microstructures 312, 314, 316 may have randomly distributed peak heights and/or spacings between individual sub-microstructures.

While the microstructure 300 of the illustrated example is ridge-shaped, the microstructure 300 may be any appropriate shape or geometry, including any of the shapes and/or any combination of the shapes described below in connection with FIGS. 5A-5F. Similarly, while the sub-microstructures 312, 314, 316 are shown as having a substantially triangular ridge shaped profile or cross-section in FIG. 3, they may be any appropriate shape including any of the shapes and/or any combination of the shapes or geometries associated with FIGS. 5A-5F shown below.

In some examples, coatings may be applied to the microstructure 300 and/or any of the sub-microstructures 312, 314, 316. For example, the microstructure 300 and/or the sub-microstructures 312, 314, 316 may be coated with an anti-reflective coating, a reflective coating and/or colored coatings (e.g., paints, inks or dye infusions) in their entirety and/or partially coated on a single side or facet to control the reflection of light in a pre-defined direction and/or viewing angle(s). In some examples, coatings are only applied to portions of the microstructure 300 (e.g., the base portion 308, the intermediate portion 306 and/or the distal portion 304) and/or portions of the sub-microstructures 312, 314, 316 (e.g., upwardly facing surfaces of the sub-microstructures 314, etc.).

Figure 4:
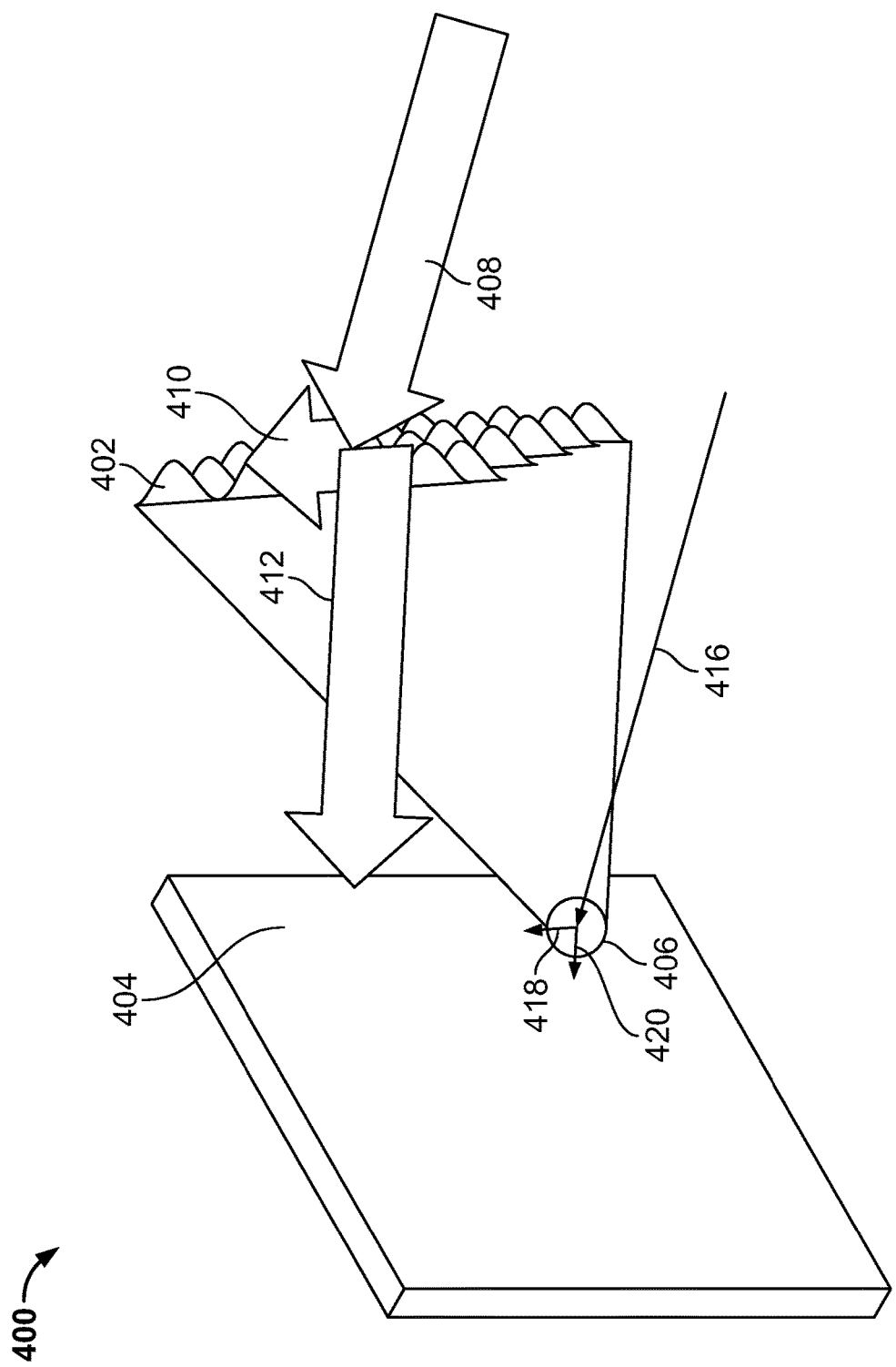
FIG. 4 illustrates an example surface section of another example microstructure with a superimposed sub-microstructure that may be smaller than a wavelength of light.

FIG. 4 illustrates an example microstructure surface 400 with superimposed sub-microstructures (e.g., nanostructures) 402 on a surface 404. In this example, the microstructure 400 and the superimposed sub-microstructures 402 are also polymer and, thus, define an air-polymer interface 406 for incident light rays. In contrast to the sub-microstructures 312, 314, 316 described above in connection with FIG. 3, the sub-microstructures 402 of the illustrated example have rounded cone-like protrusions sometimes referred to as a motheye geometry. The example sub-microstructures 402, which extend generally perpendicular to the surface 404, have associated characteristic dimensions (e.g., are separated by distances, have corresponding pitch distances, etc.) similar to or on the order of the wavelength of incident light (e.g., less than the wavelength of light) and/or aspect ratios defined between distances and heights of sub-microstructures superimposed on a microstructure.

In this example, an arrow 408 represents a general direction of an incident light ray directed towards the sub-microstructures 402. As a result of being directed towards the sub-microstructures 402, the example incident light ray is divided into a smaller reflected portion represented by an arrow 410, and a larger transmitted and/or absorbed portion, which is coupled into the material, based on the material properties and is represented by an arrow 412. The arrows 408, 410, 412 of the illustrated example are also represented by arrows 416, 418, 420, respectively, which are shown relative to the surface 404. In this example, the arrow 418 is reflected and the arrow 420 is transmitted and refracted. However, the sub-microstructures 402 of the illustrated example significantly reduce the intensity of Fresnel reflection(s) by creating a gradual change in refractive index from air to a material of the microstructure 400 and, thus, reduce glint from the surface 404.

FIGS. 5A-5G illustrate examples of geometries (e.g., shapes) that may be used for microstructures as well as sub-microstructures (e.g., nanostructures) that may be superimposed onto microstructures. The example shapes of FIGS. 5A-5G may also be utilized as any combination of these shapes and/or any other appropriate shape for both microstructures and sub-microstructures. In particular, the shapes shown in FIGS. 5A-5G may be superimposed onto one another (e.g., as sub-microstructures imposed onto a microstructure, etc.). For example, an example protrusion 540 of FIG. 5E may be superimposed as a sub-microstructure onto an example protrusion 562 or the gap 564 of FIG. 5G and vice-versa.

FIG. 5A depicts an example protrusion (e.g., a bump, a protrusion from a base surface, etc.) shape 500 that may be used to implement the example microstructures and/or sub-microstructures described herein. The example protrusion shape 500 also has a corresponding bump profile (e.g., a cross-sectional shape) 504, which may vary along multiple directions, and which may be sinusoidal, parabolic, triangular, or any other appropriate geometry. In example microstructures with a parabolic-shaped profile, sub-microstructures may be superimposed onto the parabolic-shaped microstructure closer of the microstructure as opposed to a triangular-shaped microstructure. In some examples, sub-microstructures placed near a tip of the triangular-shaped microstructure may cause structural weakness and/or may not be possible due to manufacturing constraints (e.g., a tool may not pull away from the triangular-shaped microstructure without damaging the sub-microstructures near the tip).

FIG. 5B depicts example geometries, which are shown as individual shapes and may be applied to microstructures or sub-microstructures. The example geometries include a triangular shape 510, a cylindrical shape 512, a rectangular shape 514, and a sinusoidal and/or parabolic shape 516. The triangular shape 510 may be a cone, a pyramidal shape or a triangular ridge, for example. In general, the example geometries of FIG. 5B may be shape profiles with corresponding depths (e.g., a two-dimensional shape with a defined depth to be extended or extruded) or a three-dimensional shape such as a cone. For example, the parabolic shape 516 may be extruded/extended as a cross-section or may be revolved around an axis to have a three-dimensional parabolic shape.

FIG. 5C depicts an example geometry 520 with varying heights, which may be applied to microstructures or sub-microstructures. The geometry 520 of the illustrated example includes peaks 522 and sub-peaks 524, which may be arranged in a relatively regular pattern (e.g., an alternating pattern) or may not be arranged in a regular pattern (e.g., a random distribution). Alternatively, a predefined number of sub-peaks 524 may be located in spans between the peaks 522 (e.g., three sub-peaks 524 between the peaks 522 in one or more directions, etc.). In any of these examples, the arrangement of the peaks 522 and the sub-peaks 524 relative to one another may allow different optical effects and/or glint reduction. In some examples, the sub-peaks 524 may be microstructures or sub-microstructures.

FIG. 5D depicts a two-dimensional or three-dimensional example slant geometry 530 that may allow for improved and/or desired optical effects and/or greater manufacturing ease via a simplified tool release, for example. The slant geometry 530 of the illustrated example may be implemented as a microstructure or a sub-microstructure. For example, a sub-microstructure with a slant geometry may be superimposed onto a microstructure having a slant geometry.

FIG. 5E depicts three-dimensional protrusions 540 with a pattern that extends (e.g., protrudes) from a surface. In this example, the protrusions 540 have a cone-like shape. The protrusions 540 of the illustrated example may have rectangular facets and/or be cones having circular cross-sections. While the illustrated example of FIG. 5E shows cone-like shapes, any appropriate shape may be used including those described in the examples disclosed herein. In some examples, three-dimensional parabolic functions (e.g., revolved parabolic functions) may be used to define three-dimensional protrusions.

FIG. 5F depicts three-dimensional indentations 550 on a surface. The example indentations 550 may be any appropriate shape, including those described herein. For example, the indentations may be oval-like or circular indentations (e.g., bump indentations), holes, ridges and/or grooves, etc. In some examples, a combination of the three-dimensional indentations 550 and cone-like protrusions such as the cone-like geometry 540 of FIG. 5E may be used to define a shape of a microstructure or a sub-microstructure with unique optical characteristics.

FIG. 5G depicts a pattern 560 in which protrusions (e.g., triangular ridges) 562 are separated by gaps (e.g., planar gaps) 564, which is similar to the microstructure 200 of FIG. 2. In this example, the protrusions 562 are spaced at substantially similar or equal distances to one another. However, in other examples, the spacings between the protrusions 562 may vary (e.g., may be irregular) to improve manufacturability (e.g., tool separation) and/or for certain desired optical effects. In some examples, the gaps 564 are curved, have multiple segments and/or are contoured.

Figure 6:
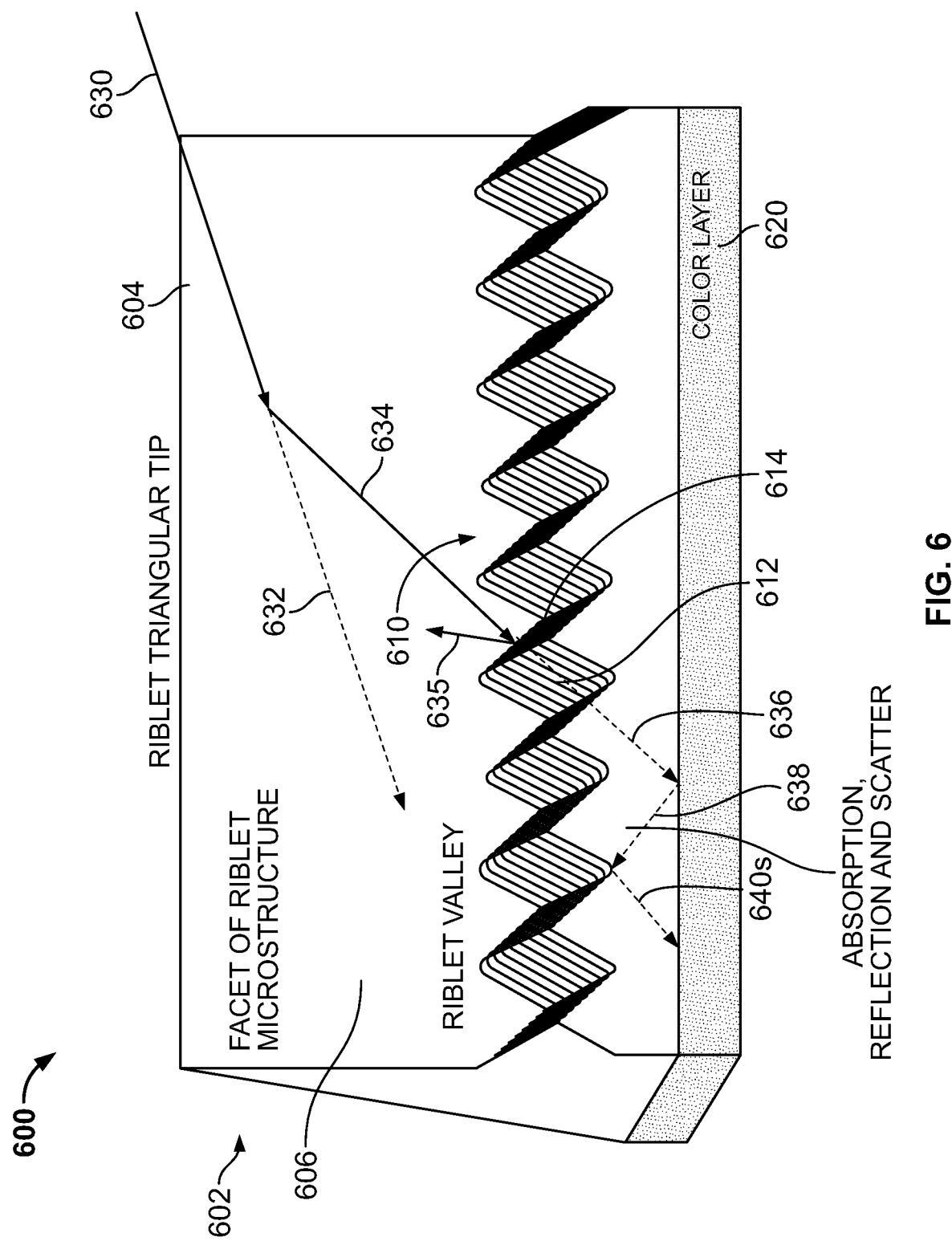
FIG. 6 is a view of another example microstructure with sub-microstructures superimposed on a base surface of the example microstructure.

FIG. 6 is a view of another example microstructure 600, which is a riblet in this example. The example microstructure 600 includes a microstructure ridge (e.g., a riblet ridge) 602 with a generally triangular-shaped tip 604 and a surface (e.g., a facet) 606 of the ridge 602. The example microstructure 600 includes sub-microstructure ridges 610 that extend across a base of the microstructure 600 between (e.g., span between) the riblet ridge 602 and another adjacent riblet ridge. In this example, the sub-microstructure ridges 610 are sub-microstructures provided on the base of the microstructure 600 and also include ridge surfaces (e.g., facets) 612, 614 adjacent to one another and defining peaks of the ridges 610. In some examples, the ridge surfaces 612, 614 are at different slope angles from a vertical line relative to one another (e.g., the ridge surfaces 612, 614 are at different angles relative to a vertical line in the view shown in FIG. 6). The microstructure 600 and the sub-microstructure ridges 610 of the illustrated example are adjacent a color layer 620.

In this example, the riblet ridge 602 and the sub-microstructure ridges 610 extend in generally perpendicular directions relative to one another. In other examples, the example sub-microstructure ridges 610 may be substantially parallel or at an angle relative to the riblet ridge 602. In some examples, a surface, which spans between the ridge 602 and the adjacent ridge, has contours that may be relatively flat, curved and/or angled between the riblet ridge 602 and the adjacent riblet edge and, thus, the sub-microstructure ridges 610 may follow such contours. In some examples, the sub-microstructure ridges 610 are oriented at different angles relative to the riblet ridge 602 for different optical effects including glint reduction effects (e.g., glint reduction for a specific range of viewing angles relative to the example microstructure 600, etc.) and/or may be manufactured from material that is colored (e.g., previously colored).

The microstructure 600 of the illustrated example is mechanically coupled and/or attached to the color layer 620. In some examples, the color layer 620 is integral with the microstructure 600. In some examples, the color layer 620 may be a portion of the microstructure that is colored (e.g., coated, etc.) and/or added to the microstructure 600 during a secondary process (e.g., a layering process, etc.).

In the illustrated example of FIG. 6, the microstructure 600 is semi-translucent, fully translucent or transparent. In particular, the example microstructure ridge 602 and the sub-microstructure ridges 610 may allow at least a portion of light to travel therethrough, while reflecting another portion of the light based on the refractive light index of the mediums, and incident angles at the interfaces, through which the light travels. In this example, an incident light ray 630 is directed towards the surface 606 of the microstructure ridge 602. The incident light ray 630 of the illustrated example has a resulting transmitted component 632 that is absorbed in and/or travels through the ridge 602. The incident light ray also has a reflected component 634 that is directed towards the sub-microstructure ridges 610. In some examples, the incident ray 630 is at least partially absorbed in the microstructure ridge 602 via sub-microstructures (e.g., the sub-microstructures 312, 314, 316, 402) superimposed onto the surface 606.

The reflected component 634 of the illustrated example is an incident ray onto the sub-microstructure ridges 610. The incident ray 634, strikes the sub-microstructure facet 614, thereby creating another reflected ray 635 that is directed back to the microstructure surface 606, where it may be scattered, transmitted therethrough and/or absorbed, thereby reducing glint. Additionally, a resulting transmitted component 636 is coupled into the microstructure base layer and directed towards the color layer 620, in which a reflection portion 638 may then be reflected towards the surfaces 612, 614, and another portion 640 may be absorbed or scattered within the base of the microstructure 600. Such absorbing and/or scattering may further reduce glint by re-directing the portion 640 into multiple directions. In some examples, directing reflected portions towards other sub-microstructures (e.g., sub-microstructures on the surface 606) may also further reduce glint (e.g., routing reflected light components towards sub-microstructures).

As mentioned above, in some examples, sub-microstructures on the surface 606, for example, reduce the amount of light reflected towards the sub-microstructure ridges 610. In some examples, the ridges 610 and/or the surfaces 612, 614 have sub-microstructures superimposed thereon.

Additionally or alternatively, either of the surfaces 612, 614 may be a reflective (e.g., mirrored) surface and/or have reflective portions to control the magnitude and direction of the reflected light. While the ridges 610 are sub-microstructures in this example, they may be microstructures (e.g., dimensions having larger than sub-microstructures as described herein), but still are relatively smaller in comparison to the microstructure 600. It has been determined that relatively smaller secondary microstructures placed between (e.g., at base surfaces between) primary microstructures and approximately a third of the size and/or spacing of the primary microstructures may also control and/or reduce glint. Thus, the sub-microstructure ridges 610, in some examples, may instead be microstructures, which may or may not have sub-microstructures superimposed thereon. Such microstructures may have dimensions (e.g., heights) such as a height approximately a third of a height or width of the microstructure ridge 602 (or smaller) to effectively control glint.

Figure 7:
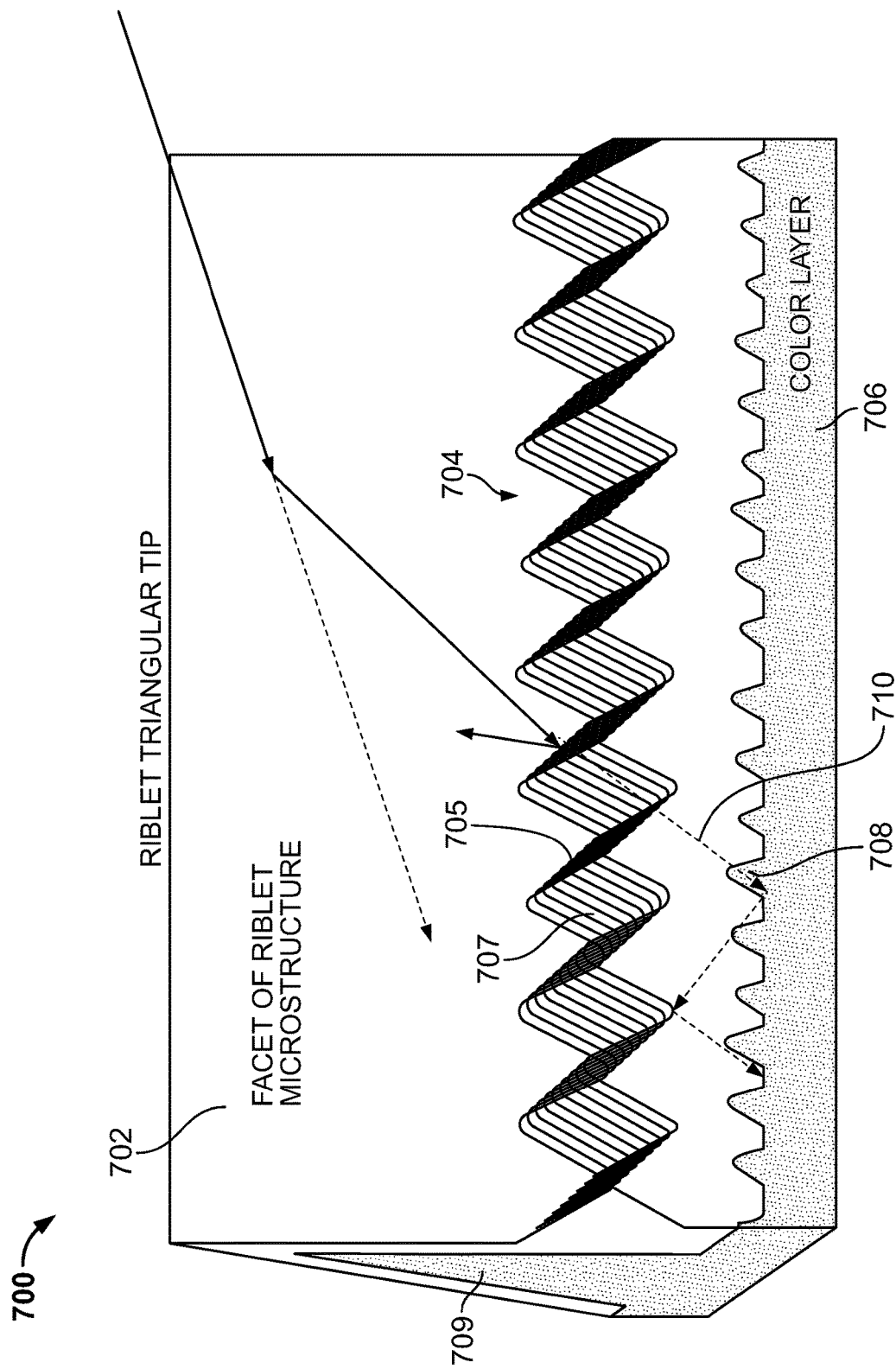
FIG. 7 is a view of another example microstructure with sub-microstructures superimposed on a base surface of the example microstructure and having additional sub-microstructures at an interface.

FIG. 7 is a view of another example microstructure 700 with a ridge 702 and ridges 704 that includes surfaces 705, 707. The microstructure 700 of the illustrated example is similar to the example microstructure 600 of FIG. 6, but instead has a textured color layer 706 with sub-microstructures 708 that define a textured interface between the color layer 706 and the rest of the microstructure 700 instead of a relatively flat interface, as shown in the example microstructure 600 of FIG. 6. In some examples, the color layer 706 has a portion (e.g., an extension, a protrusion, etc.) 709 that extends and/or partially extends into the riblet tip 702. In this example, a transmitted ray 710 is reflected from a surface of the ridge 702 and then transmitted through the sub-microstructure surface 705 into the base layer may be absorbed and/or scattered by the sub-microstructures 708, for example. In particular, the sub-microstructures 708 may be spaced apart at distances similar to the wavelength of visible light. In this example, the portion 709 of the color layer 706 that extends into the ridge 702 may affect the amount of light scattered and/or absorbed, or affect a manner in which the color layer 706 is viewed by an observer. Additionally or alternatively, in a similar manner, the color layer 706 may extend into the ridges 704 (e.g., at least partially match the contours of the ridges 704), for example. In some examples, the color layer 706 has a textured interface at an interface in which the color layer 706 extends into the riblet tip 702 and/or the ridges 704.

In some examples, the sub-microstructures 708 and/or a roughness associated with the sub-microstructures 708 is used to enhance coupling to the microstructure base color layer 706. In particular, the sub-microstructures 708 enhance optical and mechanical coupling to the microstructure 700 by increasing contact surface area between the color layer 706 and the microstructure 700. In some examples, the surfaces 705, 707 may be reflective (e.g., mirrored). Additionally or alternatively, only the surfaces 705 may be reflective while the surfaces 707 may be at least semi-translucent (e.g., translucent, transparent, etc.) and vice-versa. Making only a portion of the surfaces reflective allows control of reflectivity and/or light absorption from different viewing angles. In some examples, the sub-microstructures 708 may not be sub-microstructures and may instead be larger textured features on the order of microstructure dimensions.

Figure 8:
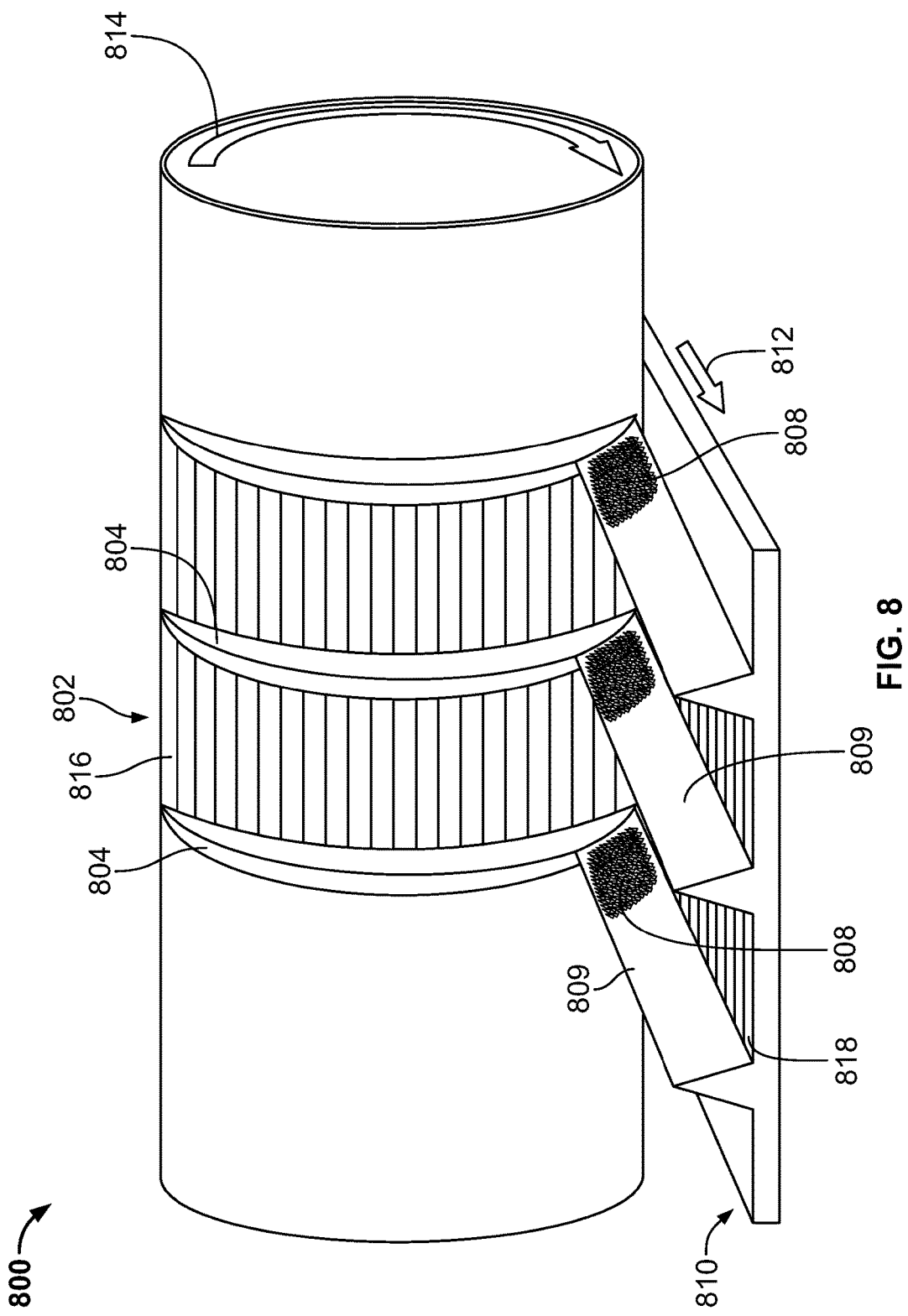
FIG. 8 illustrates an example roll-forming system that may be used to implement the examples disclosed herein.

FIG. 8 illustrates an example forming system 800, which uses roll-forming, that may be used to implement the examples disclosed herein. The example roll-forming system 800 includes a roller 802 with sub-microstructure forming grooves 804. In the illustrated example of FIG. 8, the roll-forming system 800 is being used to form (e.g., emboss) sub-microstructures (e.g., motheye sub-microstructures, sub-microstructure ridges, etc.) 808 onto ridges 809 of a microstructure (e.g., a riblet) 810.

During operation of the roll-forming system 800, the microstructure 810 moves in a direction generally indicated by an arrow 812 while the roller 802 rotates in a direction generally indicated by an arrow 814. In this example, motheye forming structures to form the sub-microstructures 808 on the ridges 809 are within the grooves 804 (e.g., tooling shapes and/or geometry used to form the sub-microstructures 808), which also have complementary indentations to receive the ridges 809. The motheye forming structures in the grooves 804 may vary in size to form smaller sub-microstructures near the tip of the microstructure ridges 809 while forming larger sub-microstructures elsewhere on the microstructure ridges 809, for example (see FIG. 3). In some examples, a force applied to the microstructure 810 via the roller 802 is adjusted to alter a degree to which the sub-microstructures 808 are formed onto the microstructure 810. Additionally or alternatively, a line speed at which the microstructure 810 moves relative to the machining system 800 and/or a rotational speed of the roller 802 is adjusted to control the process of forming the sub-microstructures 808 on the microstructure 810 and/or a degree to which the sub-microstructures 808 are formed on the microstructure 810. In some examples, the roller surface 802 may have structures 816 to form (e.g. emboss) sub-microstructures (e.g., ridges) into microstructure base areas 818 between the microstructure ridges 809.

Figure 9:
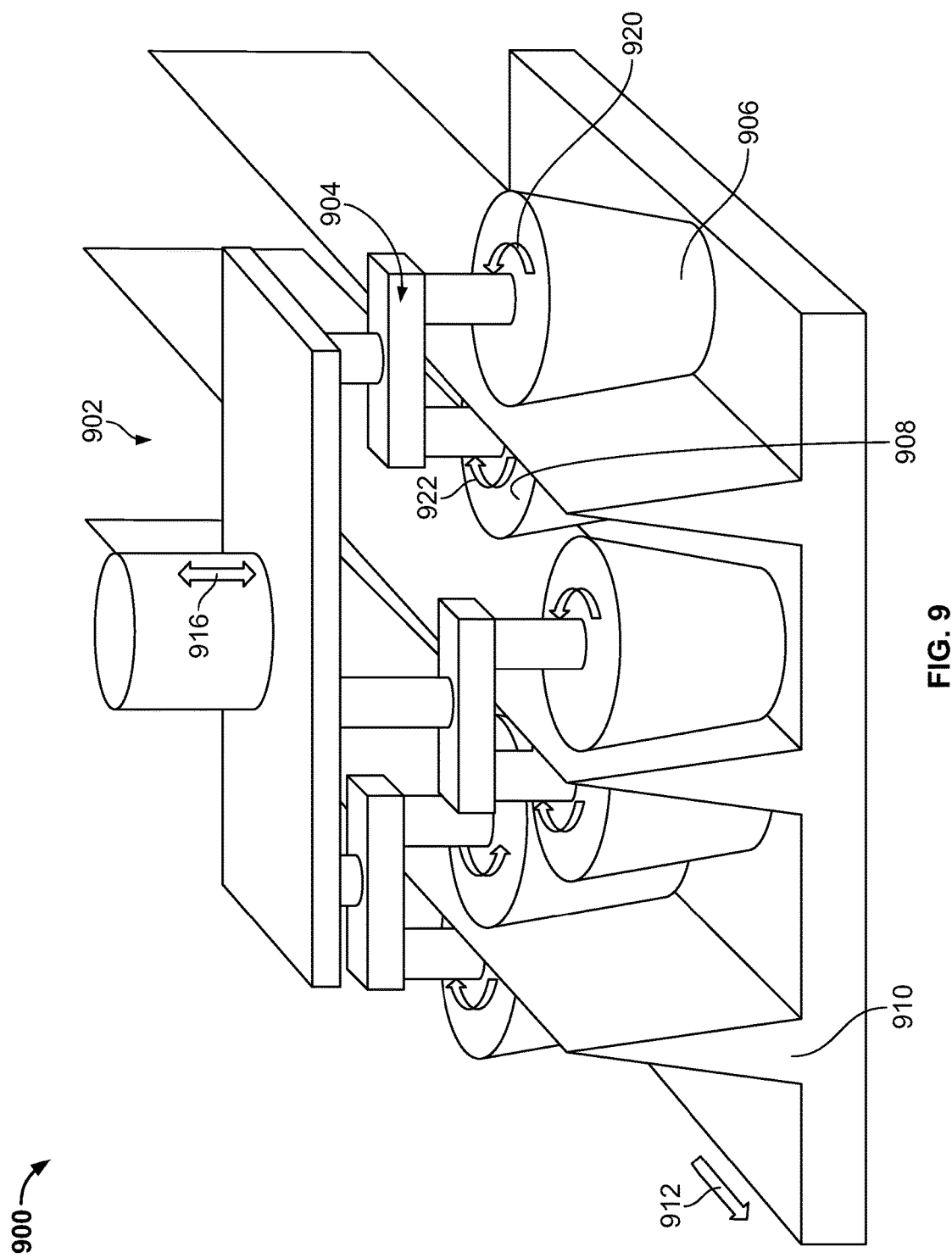
FIG. 9 illustrates an example embossing system that may be used to implement the examples disclosed herein.

FIG. 9 illustrates an example forming system 900 that may also be used to implement the examples disclosed herein. The example forming system 900 includes an embossing rig 902, on which alignment fixtures 904 are mounted. The fixtures 904 each have forming rollers (e.g., tapered embossing rollers) 906, 908 to form (e.g., emboss) sub-microstructures onto a microstructure 910.

In operation, the forming system (e.g., a secondary process system) 900 of the illustrated example forms the sub-microstructures onto the microstructure 910 as the microstructure 910 is extruded in a direction generally indicated by an arrow 912. In this example, the microstructure 910 is a riblet (e.g., a riblet substrate) that is extruded. During operation of the embossing rig 902, the embossing rig 902 may move in an upward or downward direction generally indicated by a double arrow 916. To form and/or add the sub-microstructures onto the microstructure 910, the rollers 906, 908 of the illustrated example rotate in direction generally indicated by arrows 920, 922, respectively.

Figure 10:
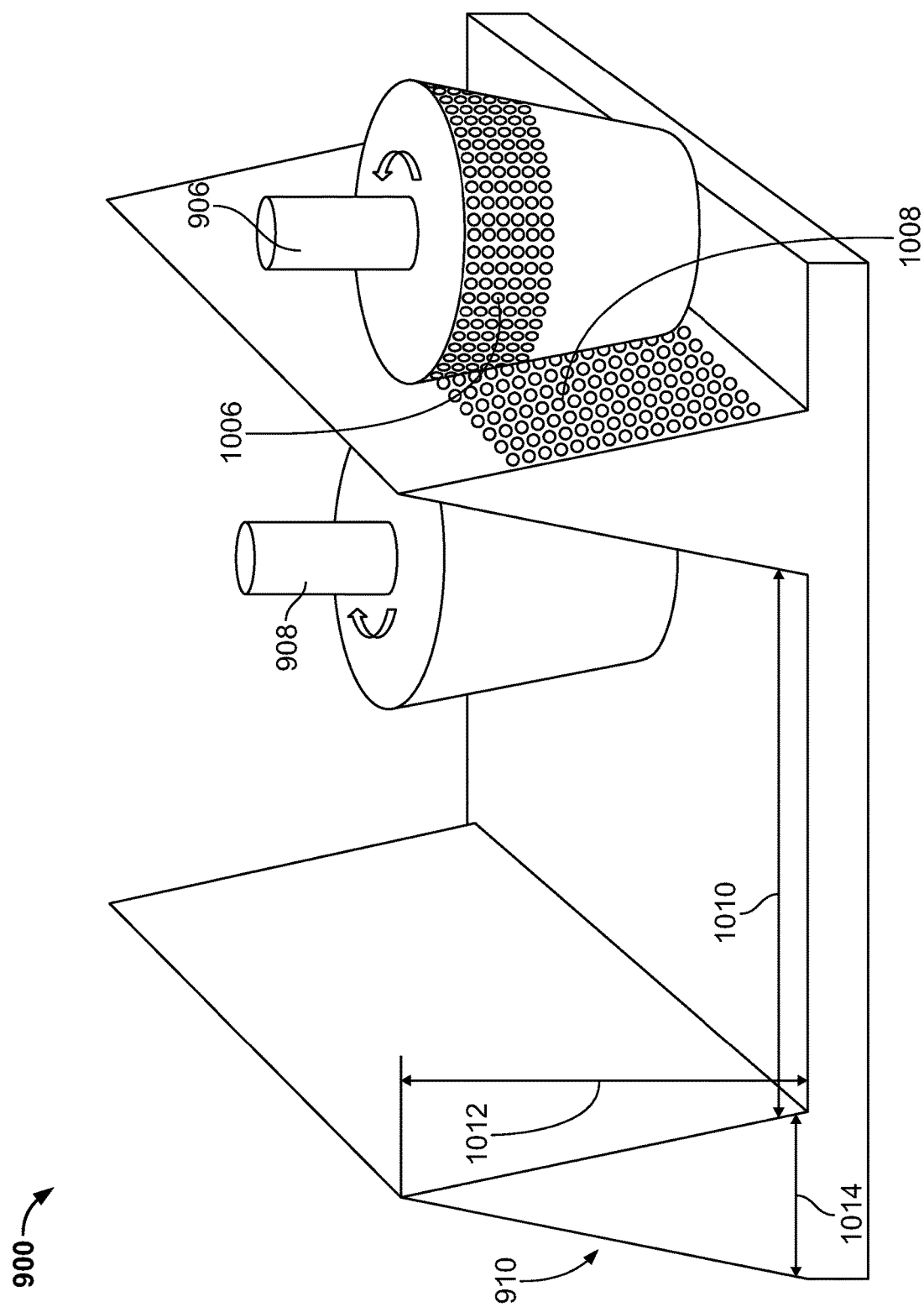
FIG. 10 is a detailed view of the example embossing system of FIG. 9.

FIG. 10 is a detailed view of the example forming system 900 of FIG. 9. As mentioned above, the example rollers 906, 908 form sub-microstructures onto the microstructure 910. During rotation of the rollers 906, 908 and as the microstructure 910 moves relative to the rollers 906, 908, surface features 1006 are used to emboss sub-microstructures 1008 on the microstructure 910. In particular, the surface features 1006 may include motheye sub-microstructures and/or motheye-forming structures or any other appropriate sub-microstructure-forming structures (e.g. ridges) to emboss the sub-microstructures 1008 onto the microstructure 910. In some examples, heights of the sub-microstructures 1008 may vary along an extruded depth of the microstructure 910 by moving the rollers 906, 908 (e.g., upward or downward, sideways) or varying the pressure relative to the microstructure 910 as the microstructure 910 moves relative to the forming system 900. In this example, each ridge of the microstructure 910 is separated by approximately 50-100 microns, as indicated by a dimension 1010, each ridge height is approximately 30-60 microns, as indicated by a dimension 1012, and each ridge is approximately 5-30 microns wide at the base, as indicated by a dimension 1014. In this example, spacing between peaks of each ridge of the microstructure 910 is approximately 75-100 microns. The aforementioned dimensions and/or parameters are only examples and may vary by application, fluid properties of a fluid in which a vehicle is travelling through and/or predicted environmental operating conditions, etc.

Figure 11:
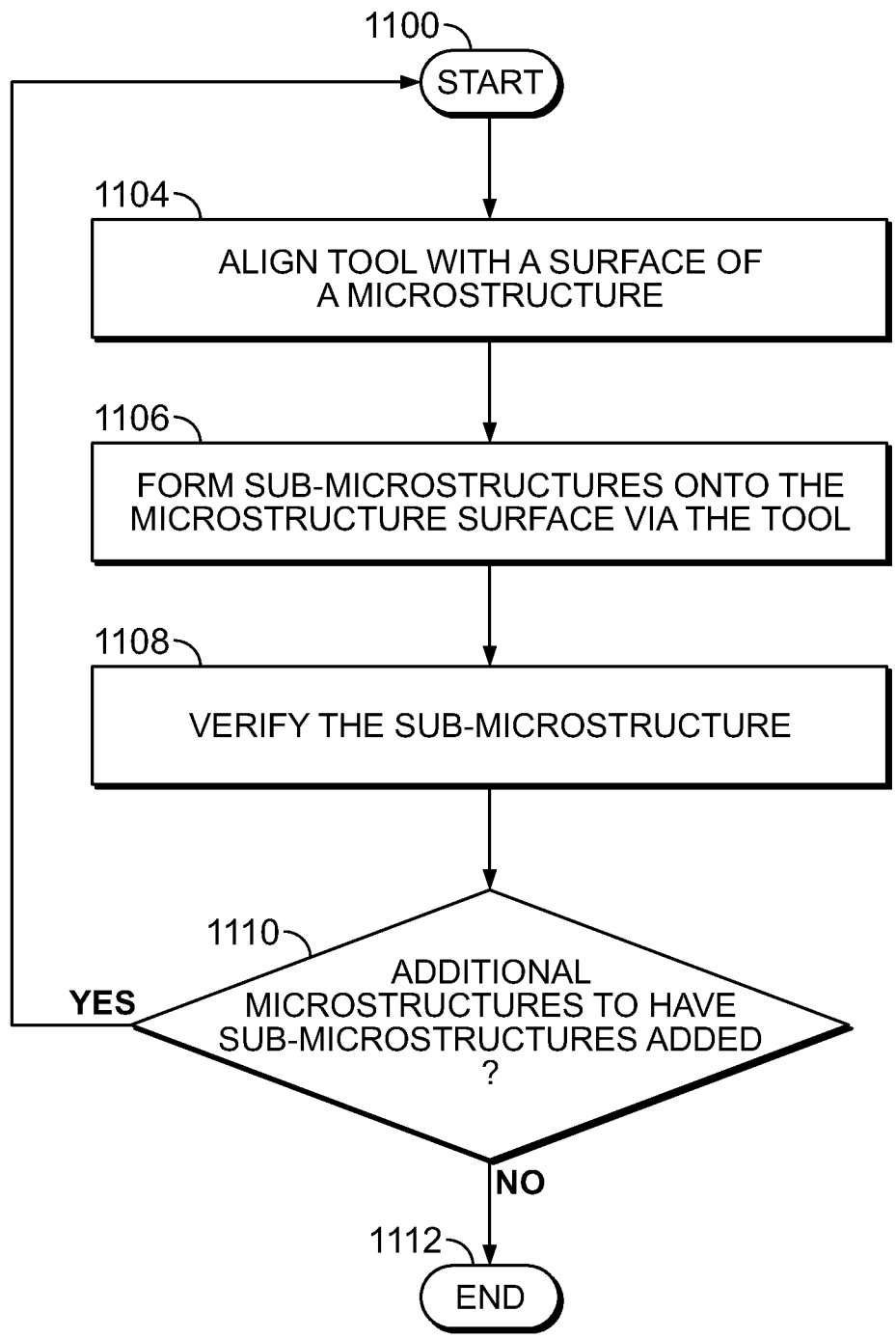
FIG. 11 is a flowchart representative of an example method that may be used to implement the examples disclosed herein.

FIG. 11 is a flowchart representative of an example method that may be used to implement the examples disclosed herein. The example method begins at block 1100 where a microstructure (e.g., the microstructures 300, 400, 600, 700, 910) is being formed (e.g., extruded and/or machined) and prepared to receive sub-microstructures onto one or more surfaces of the microstructure. In this example, the sub-microstructures are being added to the microstructure to reduce visibility and/or glint of the microstructure.

A tool is aligned with a surface of the microstructure (block 1104). For example, a roll forming cylinder such as the cylinder 802 is aligned to the microstructure (e.g., the microstructure 806). The tool of the illustrated example may be aligned through visual means and/or mechanical biasing (e.g., spring loaded against the microstructure as it is being extruded, etc.). In some examples, the microstructure is moved and/or positioned to be properly aligned relative to the tool. In other examples, machining rollers (e.g., the rollers 906, 908) of an embossing rig such as the embossing rig 902 are aligned via visual and/or mechanical means to a microstructure as the microstructure is being extruded (e.g., an inline secondary process to form the sub-microstructures).

Next, the tool provides sub-microstructures onto the microstructure (block 1106). In this example, the sub-microstructures formed on the microstructure by embossing. In some examples, a force placed on an embossing tool is varied to adjust the degree to which the microstructure is embossed. In some examples, a line speed of the microstructure and/or a rotational speed of an embossing roller (e.g., the roller 802) is varied to control the degree to which sub-microstructures are provided to the microstructure.

The sub-microstructures are verified (block 1108). In some examples, an inspection system such as a camera-based system verifies that the sub-microstructures are properly provided to the microstructure (e.g., by visual verification). Additionally or alternatively, the degree to which the sub-microstructures have been provided (e.g., embossed) onto the microstructure is determined and/or verified (e.g., surface area of the microstructure covered, height and/or depth of the sub-microstructures, etc.).

Next, it is determined whether additional sub-microstructures are to be added (block 1110). This determination may occur by determining how much of the microstructure has been extruded and/or how much microstructure can be extruded, for example. If additional sub-microstructures are to be added (block 1110), the process repeats (block 1100). If additional sub-microstructures are not to be added (block 1110), the process ends (block 1112).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft are described, the example methods and apparatus may be applied to other vehicles, watercraft, aerodynamic structures, etc.

What is claimed is:

1. An apparatus comprising:
an aerodynamic microstructure on an external surface of a vehicle, the aerodynamic microstructure having a pattern of triangular ridges; and
sub-microstructures superimposed on the aerodynamic microstructure, wherein the sub-microstructures are spaced to reduce reflections, wherein spacings between the sub-microstructures are approximately between 0.4 and 0.7 microns, wherein the aerodynamic microstructure has relatively smaller sub-microstructures near a tip of the aerodynamic microstructure and relatively larger sub-microstructures near a valley of the aerodynamic microstructure.

2. The apparatus as defined in claim 1, wherein the aerodynamic microstructure comprises an aircraft riblet.

3. The apparatus as defined in claim 1, wherein surfaces of the sub-microstructures are coated with a reflective coating.

4. The apparatus as defined in claim 1, further comprising a color layer adjacent the aerodynamic microstructure.

5. The apparatus as defined in claim 1, wherein the spacings between the sub-microstructures vary along a length of the aerodynamic microstructure.

6. The apparatus as defined in claim 1, wherein the spacings between the sub-microstructures vary along a direction of flow along the aerodynamic microstructure.

7. An apparatus comprising:
an aerodynamic microstructure on an external surface of a vehicle; and
sub-microstructures superimposed on the aerodynamic microstructure, wherein the sub-microstructures are spaced to reduce reflections, wherein spacings between the sub-microstructures are approximately a wavelength of visible light, wherein the aerodynamic microstructure has relatively smaller sub-microstructures near a tip of the aerodynamic microstructure and relatively larger sub-microstructures near a valley of the aerodynamic microstructure.

8. The apparatus as defined in claim 7, wherein the spacings between the sub-microstructures are less than about 0.4 microns.

9. The apparatus as defined in claim 7, wherein the spacings between the sub-microstructures are between about 0.4 and 0.7 microns.

10. The apparatus as defined in claim 7, wherein the aerodynamic microstructure comprises an aircraft riblet.

11. A method comprising:
operating a vehicle, wherein sub-microstructures are superimposed on aerodynamic microstructures of the vehicle, and wherein the sub-microstructures are separated by distances approximately between 0.4 and 0.7 microns to reduce reflections, the aerodynamic microstructures having a pattern of triangular ridges, wherein the aerodynamic microstructures have relatively smaller sub-microstructures near a tip corresponding to each of the aerodynamic microstructures and relatively larger sub-microstructures near a valley corresponding to each of the aerodynamic microstructures.

12. The method as defined in claim 11, wherein the aerodynamic sub-microstructures have differing geometries from bases of the microstructures to tips of the aerodynamic microstructures.

13. The method as defined in claim 11, wherein the sub-microstructures are machined onto the aerodynamic microstructures.

14. The method as defined in claim 11, wherein the sub-microstructures have one or more of a triangular shape, a grooved shape, a sinusoidal shape, a parabolic shape, a cone shape, a cylindrical shape, or a plurality of indentations.

15. A method comprising:
providing sub-microstructures on an aerodynamic microstructure, wherein the sub-microstructures are spaced to reduce reflections, wherein spacings between the sub-microstructures are approximately between 0.4 and 0.7 microns, the aerodynamic microstructure having a pattern of triangular ridges, wherein the aerodynamic microstructure has relatively smaller sub-microstructures near a tip of the aerodynamic microstructure and relatively larger sub-microstructures near a valley of the aerodynamic microstructure.

16. The method as defined in claim 15, wherein providing the sub-microstructures comprises machining, casting or extruding the sub-microstructures onto the aerodynamic microstructure.

17. The method as defined in claim 15, wherein providing the sub-microstructures comprises embossing the sub-microstructures onto the aerodynamic microstructure.

18. The method as defined in claim 15, wherein providing the sub-microstructures comprises machining or embossing the microstructure.

19. The method as defined in claim 15, further comprising aligning a tool to provide the sub-microstructures onto the aerodynamic microstructure, and wherein providing the sub-microstructures is done via the tool.

20. The method as defined in claim 19, wherein the tool is an embossment tool.

21. A method comprising:
providing a textured external surface, via a tool, onto a riblet having a pattern of triangular ridges, the riblet associated with an external surface of a vehicle to reduce glint, wherein spacings between sub-microstructures of the textured external surface are approximately between 0.4 and 0.7 microns to reduce reflections, wherein the riblet has relatively smaller sub-microstructures near a tip of the riblet and relatively larger sub-microstructures near a valley of the riblet.

22. The method as defined in claim 21, wherein the sub-microstructures have one or more of a triangular shape, a grooved shape, a sinusoidal shape, a cone shape, a cylindrical shape, a parabolic shape or a plurality of indentations.

23. The method as defined in claim 21, wherein peaks of the riblets are approximately 10-200 microns in height relative to valleys of the riblet.

24. The method as defined in claim 21, wherein the vehicle comprises an aircraft.

25. An apparatus comprising:
an aerodynamic microstructure on an external surface of a vehicle, the aerodynamic microstructure having primary peaks and base surfaces between the primary peaks; and
secondary peaks on or proximate the base surfaces, the secondary peaks having heights less than one-third of heights of the primary peaks, wherein the secondary peaks are located on an interface between a base portion of the aerodynamic microstructure and a color layer.

26. The apparatus as defined in claim 25, wherein one or more of the primary peaks or the secondary peaks have sub-microstructures superimposed thereon.

27. The apparatus as defined in claim 26, wherein one or more of the primary peaks or the secondary peaks are ridge-shaped.

28. The apparatus as defined in claim 27, wherein the primary and secondary peaks are ridge-shaped, and wherein ridges of the primary and the secondary peaks extend substantially parallel to one another.

* * * * *